(12) United States Patent
Xiao

(10) Patent No.: US 11,877,108 B1
(45) Date of Patent: Jan. 16, 2024

(54) CASE FOR WIRELESS EARPHONES

(71) Applicant: Qiufeng Xiao, Ziyang (CN)

(72) Inventor: Qiufeng Xiao, Ziyang (CN)

( * ) Notice: Subject to any disclaimer, the term of this patent is extended or adjusted under 35 U.S.C. 154(b) by 0 days.

(21) Appl. No.: 18/351,036

(22) Filed: Jul. 12, 2023

(51) Int. Cl.
*H04R 1/02* (2006.01)
*H04R 1/10* (2006.01)
*H02J 50/10* (2016.01)
*H02J 7/00* (2006.01)

(52) U.S. Cl.
CPC ............. *H04R 1/02* (2013.01); *H02J 7/0044* (2013.01); *H02J 50/10* (2016.02); *H04R 1/1016* (2013.01); *H04R 1/1025* (2013.01)

(58) Field of Classification Search
CPC ...... H04R 1/02; H04R 1/1016; H04R 1/1025; H04R 1/10; H04R 1/1058; H02J 7/0044; H02J 50/10; H02J 15/00; H02J 7/00714; H02J 13/00; H05K 5/0052; H05K 5/0086
See application file for complete search history.

(56) References Cited

U.S. PATENT DOCUMENTS 11,115,746 B1 * 9/2021 Morrison ............. H04R 1/1025
11,201,500 B2 * 12/2021 Partovi ............... H02J 7/00714

FOREIGN PATENT DOCUMENTS

| CN | 106559721 A | * | 4/2017 | ............. A45C 11/00 |
| CN | 208837105 U | * | 5/2019 | ............. A24F 47/00 |
| CN | 210609610 U | * | 5/2020 | |
| CN | 111988697 A | * | 11/2020 | ............... H04R 1/10 |
| KR | 20190068883 A | * | 6/2019 | ........... H05K 5/0052 |

* cited by examiner

*Primary Examiner* — Angelica M McKinney
(74) *Attorney, Agent, or Firm* — Daniel M. Cohn; Howard M. Cohn

(57) ABSTRACT

A case for wireless earphones includes a charging case body and a case cover. The charging case body includes an accommodating cavity for accommodating wireless earphones, and an opening of the accommodating cavity faces upwards. The case for the wireless earphones further includes a switch lock catch, a second magnet, and a third magnet, the case cover is locked through the switch lock catch, and the second magnet and the third magnet are repelled, after pressing the switch lock catch, the cover case may automatically open, so that users may operate through only one hand, which is very convenient. At the same time, when the case for the wireless earphones falls on the ground, the case cover is not easily opened, which prevent the wireless earphones from falling out and being damaged, so that the wireless earphones are well protected.

20 Claims, 6 Drawing Sheets

CASE FOR WIRELESS EARPHONES

TECHNICAL FIELD

The present disclosure relates to a technical field of cases for wireless earphones, and in particular to a case for wireless earphones.

BACKGROUND

Cases for wireless earphones, also called charging cases for earphones, charging cradles for earphones, etc., are provided for charging wireless earphones. After using the wireless earphones, users may directly charge the wireless earphones through connecting to a power supply. Moreover, current split wireless earphones have a natural disadvantage that a battery life of the current split wireless earphones is generally less than four hours, but portable charging cases may provide additional power supplement for the split wireless earphones, thereby prolonging the battery life of the split wireless earphones.

A current case for the wireless earphones generally includes a charging case body and a charging case cover. The charging case body includes an accommodating cavity having an opening facing upwards for placing the wireless earphones, a rear side of the case cover is hinged to a rear side of the charging case body, and the case cover is disposed with respect to the charging case body in an openable and closable manner, and when the current case for the wireless earphones is in a closed state, the case cover covers the opening of the accommodating cavity. In the prior art, the case cover and the charging case body are magnetically attracted and fixed through magnets, the case cover cannot automatically open, users need open the case cover only through two hands, which is inconvenient in use, and when the current case for the wireless earphones falls on the ground, the case cover is easy to open, so that the wireless earphones would fall out or are even damaged. In addition, the current case for the wireless earphones cannot be adsorbed by and fixed to a wireless charging station, so that the current case for the wireless earphones may easily slide off from the wireless charging station, and cannot be rapidly charged in place.

Therefore, it is necessary to improve the current case for the wireless earphones.

SUMMARY

Based on above and in view of lack of the prior art, the present disclosure aims to provide a case for wireless earphones that is capable automatically opening a case cover through magnets, which may effectively solve a problem of inconvenient use of current cases for wireless earphones.

In order to achieve above aims, the present disclosure a case for wireless earphones as following.

The case for the wireless earphones includes a charging case body and a case cover. The charging case body includes an accommodating cavity for accommodating wireless earphones, and an opening of the accommodating cavity faces upwards. A rear side of the case cover is hinged to a rear side of the charging case body. The case cover is disposed with respect to the charging case body in an openable and closable manner. When the case for the wireless earphones is in a closed state, the case cover covers the opening of the accommodating cavity. A plurality of first magnets are respectively disposed on both a back surface of the charging case body and a back surface of the case cover, the plurality of the first magnets are magnetically attracted and fixed to a wireless charging station for wireless charging. A second magnet is fixed to a top portion of a front side of the charging case body, a third magnet is disposed at a bottom portion of a front side of the case cover, the second magnet and the third magnet are repelled to drive the case cover to bounce upwards with respect to the charging case body. A switch lock catch capable of being elastically pressed is disposed on a front surface of the charging case body, and the switch lock catch is configured to lock the case cover.

Furthermore, the charging case body further includes an inner case, an outer case, and a lower front side plate. The outer case is sleeved on the inner case, and the lower front side plate is disposed on a front side surface of the outer case.

Furthermore, the outer case is made of a thermoplastic polyurethanes (TPU) material, and the lower front side plate is made of a Polycarbonate (PC) material.

Furthermore, the lower front side plate and the outer case are bonded and fixed through a lock catch position and an adhesive tape.

Furthermore, a lug boss is convexly disposed on a front side surface of the lower front side plate, an accommodating groove is concavely defined on the lug boss, and the switch lock catch is located in the accommodating groove.

Furthermore, shaft holes are concavely defined in inner walls of two sides of the accommodating groove, shaft portions are respectively and convexly disposed outwards at two sides of a middle portion of the switch lock catch, and the shaft portions are respectively and rotatably clamped in the shaft holes.

Furthermore, a pressing portion is disposed at a lower end of the switch lock catch, a hook portion is disposed at an upper end of the switch lock catch, a hook groove is concavely defined on the case cover, and the hook groove is matched with the hook portion.

Furthermore, an inner bottom surface of the accommodating groove integrally extends to form an elastic sheet portion, the elastic sheet portion abuts against an inner side surface of the pressing portion to drive the pressing portion to move outwards.

Furthermore, a first fixing groove is concavely defined between a top portion of the lower front side plate and a top portion of the outer case, and the second magnet is embedded in the first fixing groove for fixing.

Furthermore, a charging interface is defined at a bottom portion of the charging case body.

Furthermore, a speaker through hole is disposed at a bottom portion of the charging case body.

Furthermore, the charging case body includes a button, and the button is exposed to a middle portion of the back surface of the charging case body.

Furthermore, a lug portion is convexly disposed on the charging case body, and a rope hanging hole is defined on the lug portion.

Furthermore, first embedding grooves are defined on the back surface of the charging case body, second embedding grooves are defined on the back surface of the case cover, and the plurality of the first magnets are respectively embedded in the first embedding grooves and the second embedding grooves for fixing.

Furthermore, a combination between the plurality of the first magnets and the charging case body is reinforced through an adhesive tape.

Furthermore, the plurality of the first magnets, the first embedding grooves, and the second embedding grooves are all arc-shaped.

Furthermore, the case cover further includes an inner cover, an outer cover, and an upper front side plate. The outer cover is sleeved on the inner cover, and the upper front side plate is disposed on a front side surface of the outer cover.

Furthermore, the outer cover is made of a thermoplastic polyurethanes (TPU) material, and the upper front side plate is made of a Polycarbonate (PC) material.

Furthermore, the upper front side plate and the outer cover are bonded and fixed through a lock catch position and an adhesive tape.

Furthermore, a second fixing groove is concavely defined between a bottom portion of the upper front side plate and a bottom portion of the outer cover, and the third magnet is embedded in the second fixing groove for fixing.

Compared with the prior art, the present disclosure has obvious advantages and beneficial effect specifically as following.

The present disclosure provides the switch lock catch, the second magnet, and the third magnet, the case cover is locked through the switch lock catch, and the second magnet and the third magnet are repelled, after pressing the switch lock catch, the cover case may automatically open, so that users may operate through only one hand, which is very convenient. At the same time, when the case for the wireless earphones falls on the ground, the case cover is not easily opened, which prevent the wireless earphones from falling out and being damaged, so that the wireless earphones are well protected. In addition, the plurality of the first magnets are respectively disposed on both the back surface of the charging case body and the back surface of the case cover, and the plurality of the first magnets are magnetically attracted and fixed to the wireless charging station for wireless charging, so that the case for the wireless earphones of the present disclosure may be better adsorbed and fixed to the wireless charging station and may not easily slide off from the wireless charging station, meanwhile, the case for the wireless earphones of the present disclosure is capable of being rapidly charged in place, which brings convenience.

Figure 1:
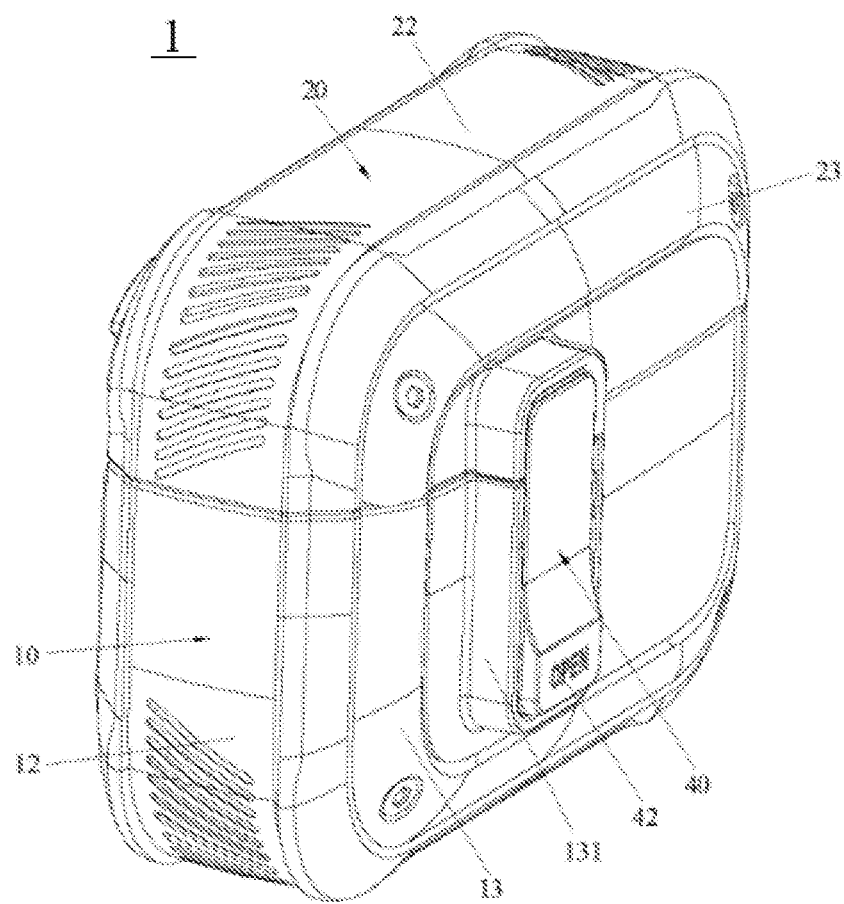
FIG. 1 is a three-dimensional assembly schematic diagram of a case for wireless earphones according to one embodiment of the present disclosure.

Reference numerals in the drawings: 1. case for wireless earphones; 10. charging case body; 11. inner case; 12. outer case; 13. lower front side plate; 131. lug boss; 132. elastic sheet portion; 101. accommodating cavity; 102. accommodating groove; 103. shaft hole; 104. first fixing groove; 105. speaker through hole; 106. lug portion; 107. rope hanging hole; 108. first embedding groove; 20. case cover; 21. inner cover; 22. outer cover; 23. upper front side plate; 201. hook groove; 202. second fixing groove; 203. second embedding groove; 31. first magnet; 32. second magnet; 33. third magnet; 40. switch lock catch; 41. shaft portion; 42. pressing portion; 43. hook portion; 51. charging interface; 52. button.

DETAILED DESCRIPTION

Figure 2:
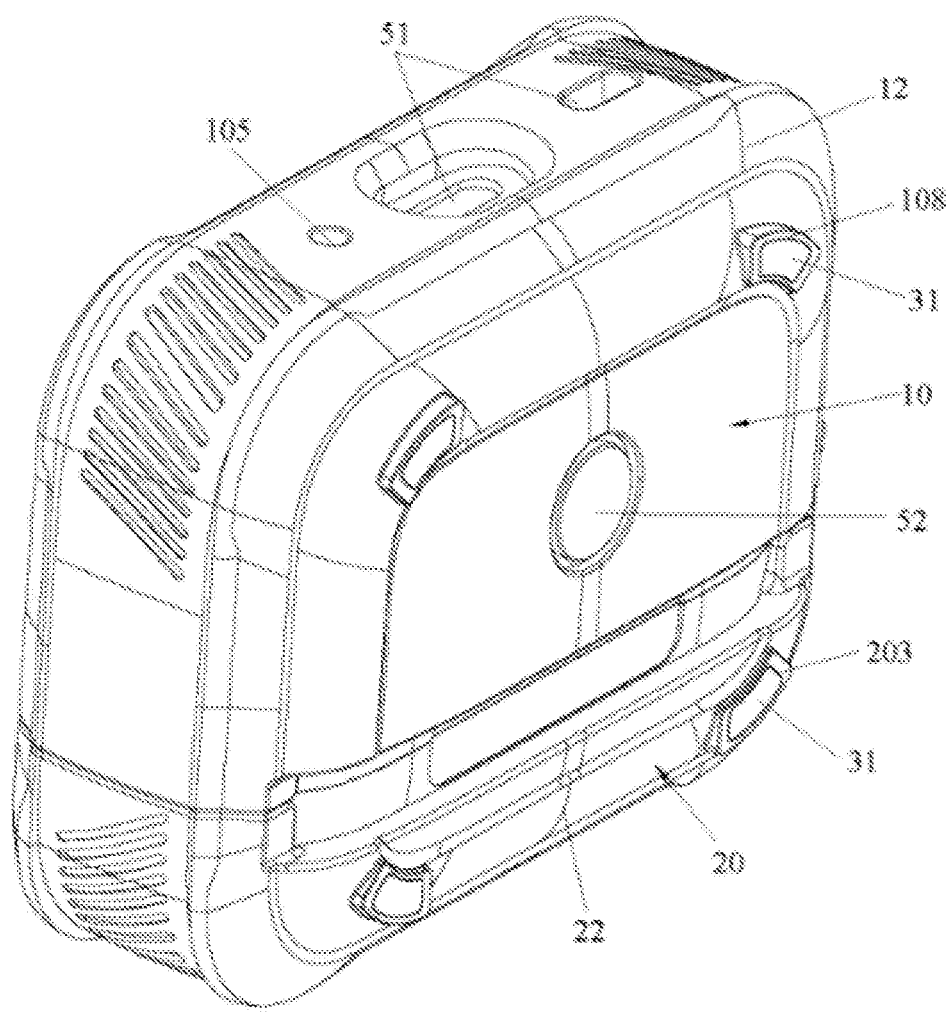
FIG. 2 is a three-dimensional assembly schematic diagram of the case for wireless earphones shown in another viewing angle according to one embodiment of the present disclosure.
Figure 3:
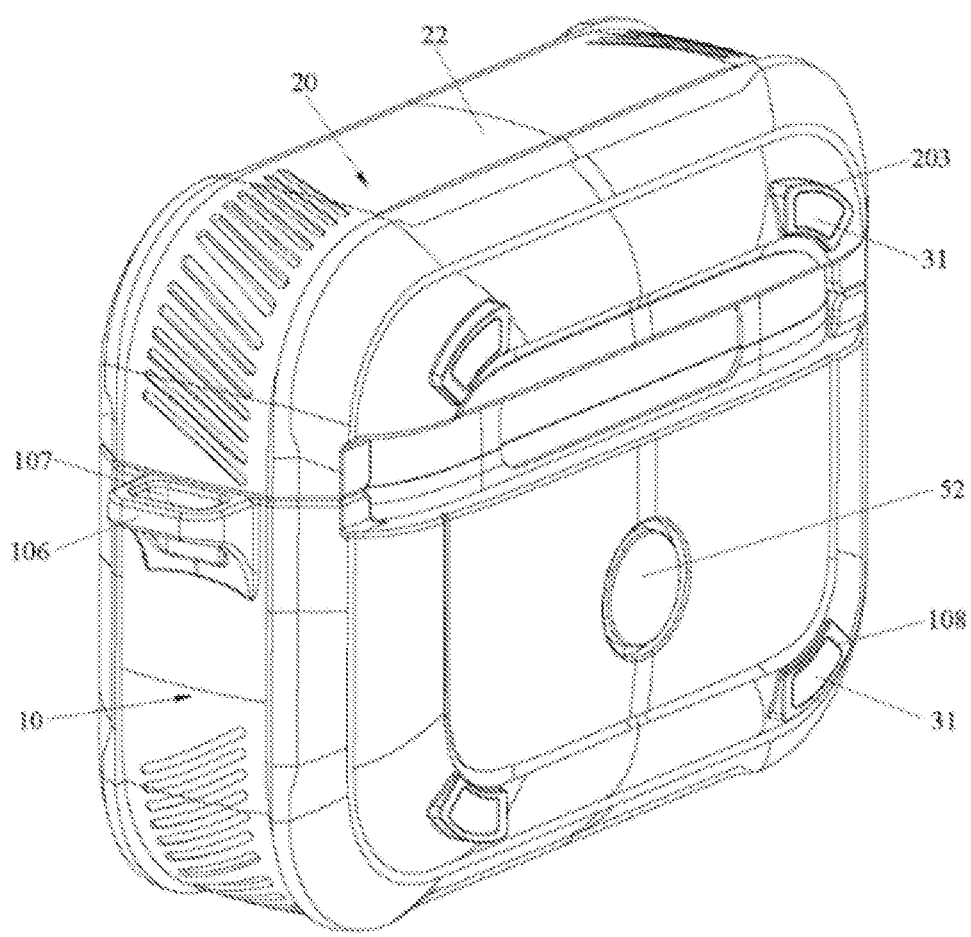
FIG. 3 is a three-dimensional assembly schematic diagram of the case for wireless earphones shown in another viewing angle according to one embodiment of the present disclosure.
Figure 4:
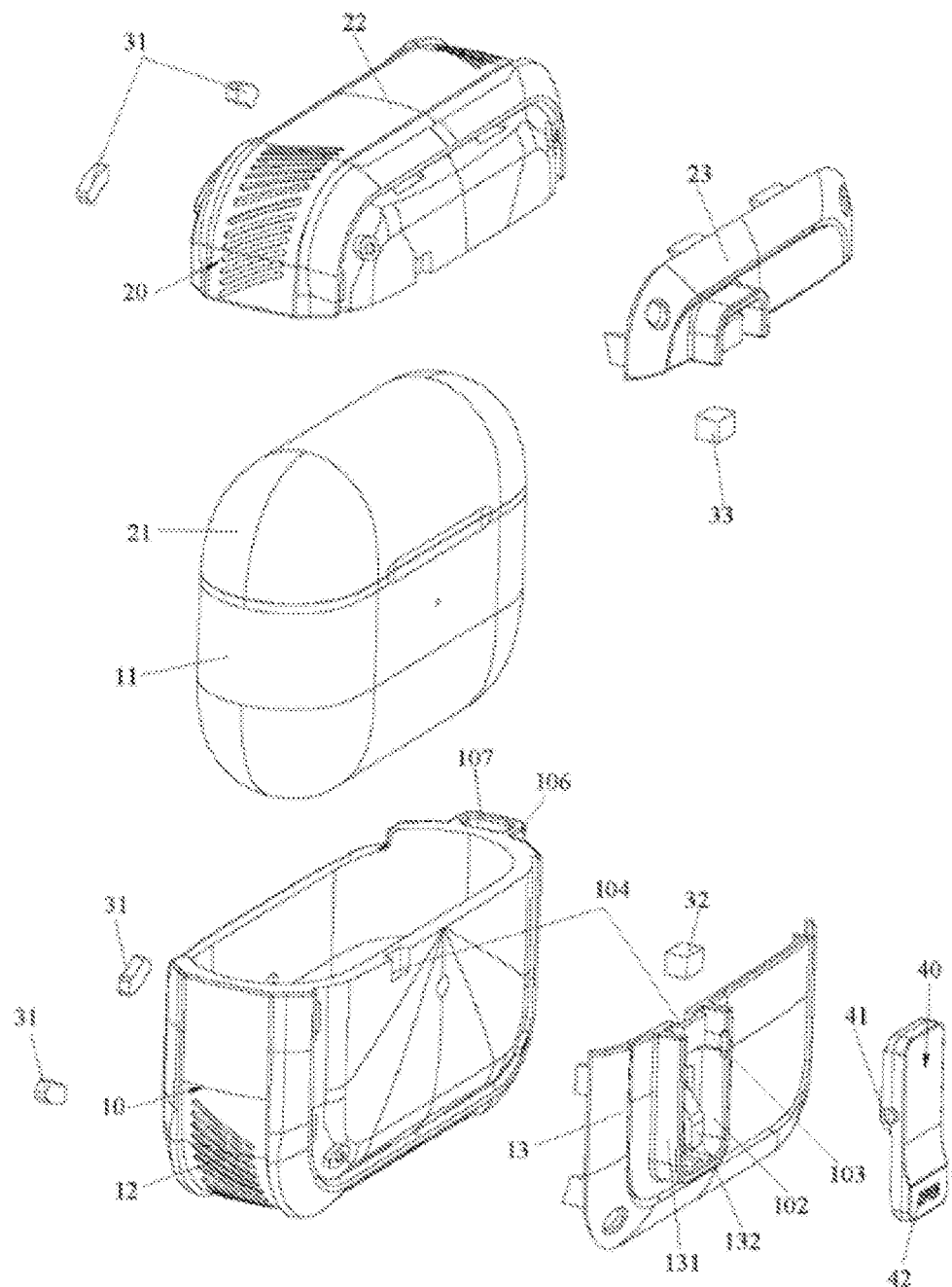
FIG. 4 is an exploded schematic diagram of the case for wireless earphones according to one embodiment of the present disclosure.
Figure 5:
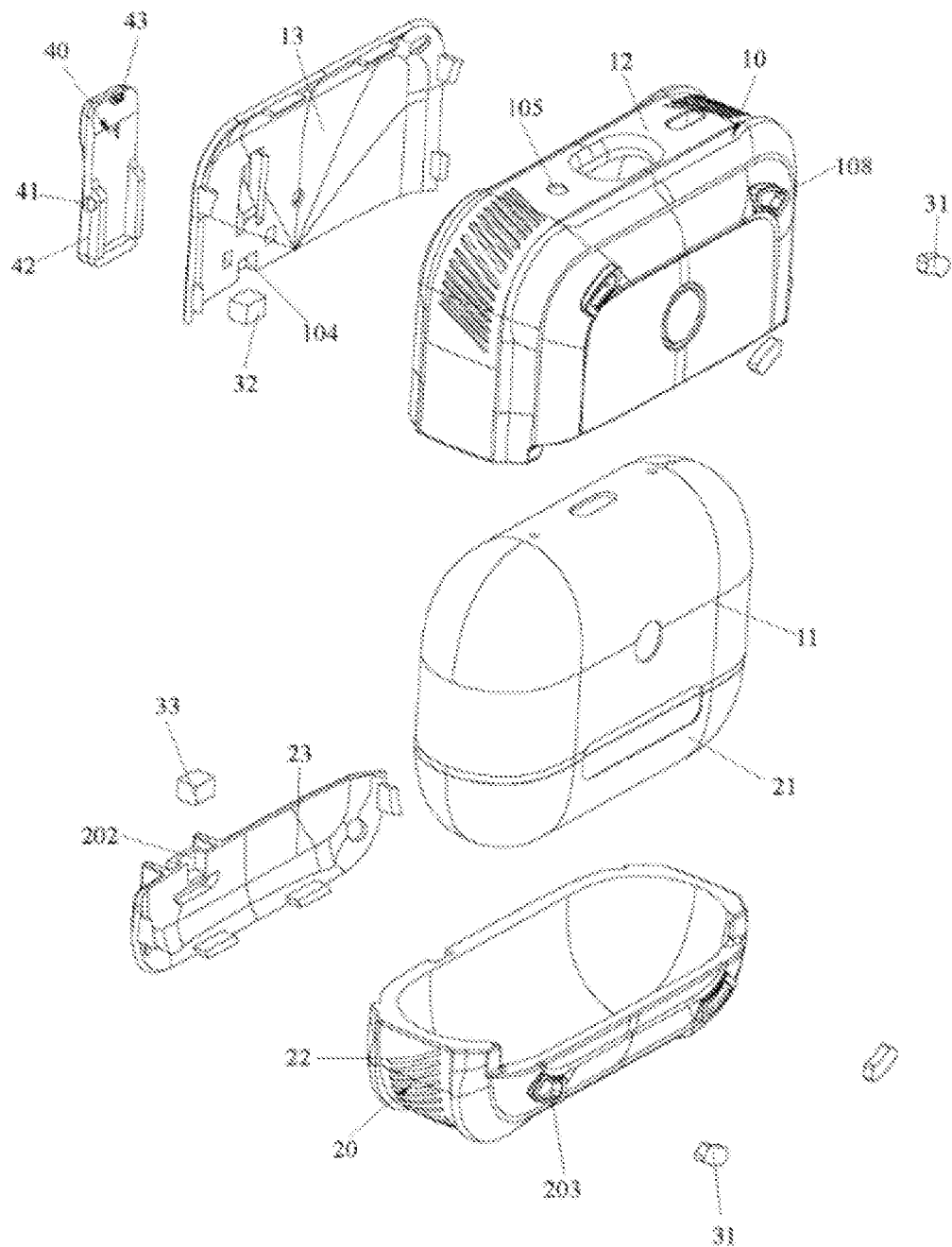
FIG. 5 is an exploded schematic diagram of the case for wireless earphones shown in another viewing angle according to one embodiment of the present disclosure.
Figure 6:
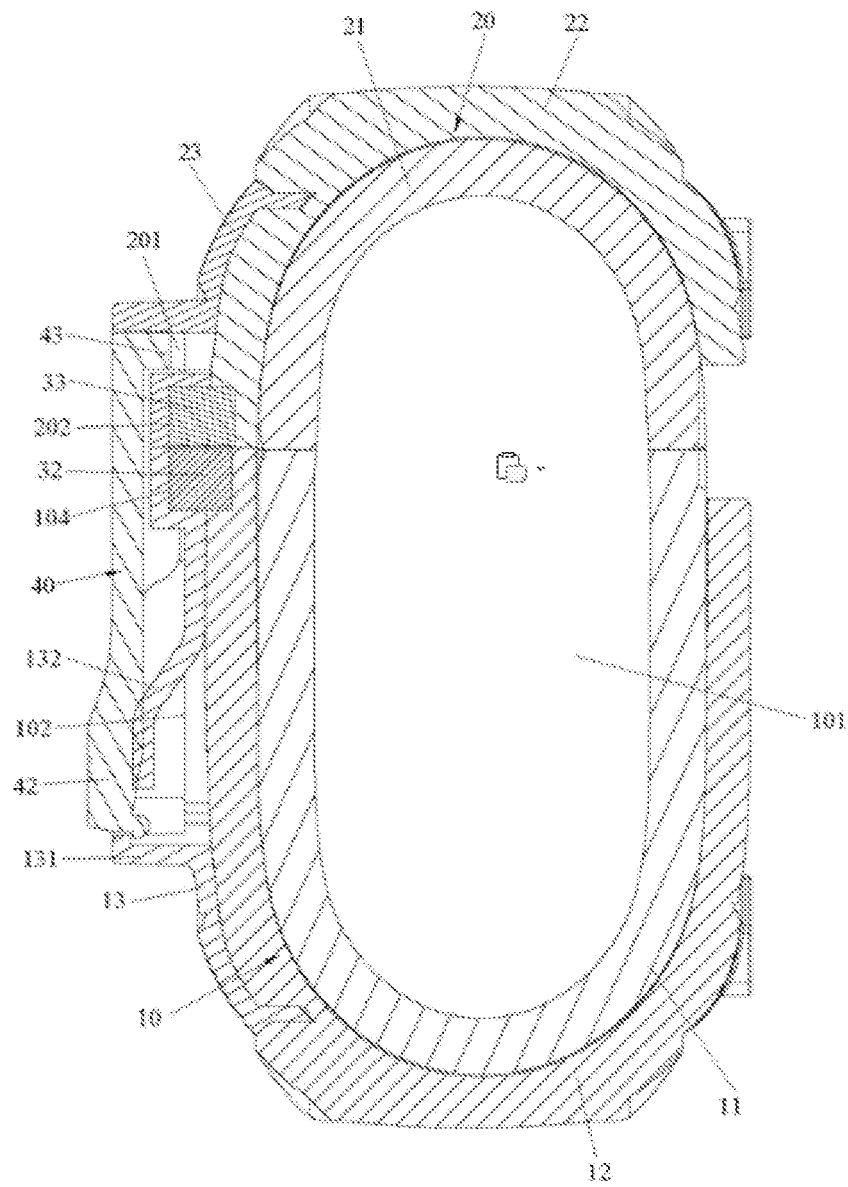
FIG. 6 is a cross-sectional schematic diagram of the case for wireless earphones according to one embodiment of the present disclosure.

Referring to FIGS. 1-6, a specific structure of one embodiment of the present disclosure is provided, including a charging case body 10 and a case cover 20.

The charging case body 10 includes an accommodating cavity 101 for accommodating wireless earphones, and an opening of the accommodating cavity 101 faces upwards. A plurality of first magnets 31 are respectively disposed on a back surface of the charging case body 10, the plurality of the first magnets 31 are magnetically attracted and fixed to a wireless charging station for wireless charging. A second magnet 32 is fixed to a top portion of a front side of the charging case body 10, A switch lock catch 40 capable of being elastically pressed is disposed on a front surface of the charging case body 10, and the switch lock catch 40 is configured to lock the case cover 20.

Specifically, the charging case body 10 further includes an inner case 11, an outer case 12, and a lower front side plate 13. The outer case 12 is sleeved on the inner case 11, and the lower front side plate 13 is disposed on a front side surface of the outer case 12. In the embodiment, the outer case 12 is made of a thermoplastic polyurethanes (TPU) material, and the lower front side plate 13 is made of a Polycarbonate (PC) material. The lower front side plate 13 and the outer case 12 are bonded and fixed through a lock catch position and an adhesive tape (not shown in the drawings), which is simple in structure and convenient for assembling. A lug boss 131 is convexly disposed on a front side surface of the lower front side plate 13, an accommodating groove 102 is concavely defined on the lug boss 131, and the switch lock catch 40 is located in the accommodating groove 102. Shaft holes 103 are concavely defined in inner walls of two sides of the accommodating groove 102, shaft portions 41 are respectively and convexly disposed outwards at two sides of a middle portion of the switch lock catch 40, and the shaft portions 41 are respectively and rotatably clamped in the shaft holes 103, so that switch lock catch 40 may be pressed and swing in the accommodating groove 102. A pressing portion 42 is disposed at a lower end of the switch lock catch 40, a hook portion 43 is disposed at an upper end of the switch lock catch 40, a hook groove 201 is concavely defined on the case cover 20, and the hook groove 201 is matched with the hook portion 43. An inner bottom surface of the accommodating groove 102 integrally extends to form an elastic sheet portion 132, the elastic sheet portion 132 abuts against an inner side surface of the pressing portion 42 to drive the pressing portion 42 to move outwards, so that the hook portion 43 is held in the hook groove 204. A first fixing groove 104 is concavely defined between a top portion of the lower front side plate 13 and a top portion of the outer case 12, and the second magnet 32 is embedded in the first fixing groove 104 for fixing. A charging interface 51 is defined at a bottom portion of the charging case body 10 for wired charging. A speaker through hole 105 is disposed at a bottom portion of the charging case body 10 for sounding. The charging case body 10 includes a button 52, and the button 52 is exposed to a middle portion of the back surface of the charging case body 10. A lug portion 106 is convexly disposed on the charging case body 10, and a rope hanging hole 107 is defined on the lug portion 106 for penetrating a hanging rope, which is convenient for carrying. First embedding grooves 108 are defined on the back surface of the charging case body 10, and the plurality of the first magnets 31 are respectively embedded in the first embedding grooves 108. Moreover, a combination between the plurality of the first magnets 31 and the charging case body 10 is reinforced through an adhesive tape. The plurality of the first magnets 31 and the first embedding grooves 108 are both arc-shaped. There are two first magnets 31 on the charging case body 10, and the two first magnets 31 are respectively located at corners of two sides of the bottom portion of the charging case body 10.

A rear side of the case cover 20 is hinged to a rear side of the charging case body 10. The case cover 20 is disposed with respect to the charging case body 10 in an openable and closable manner. When the case for the wireless earphones is in a closed state, the case cover 20 covers the opening of the accommodating cavity 101. The plurality of the first magnets 31 are further respectively disposed on a back surface of the case cover 20, the plurality of the first magnets 31 are magnetically attracted and fixed to the wireless charging station for wireless charging. A third magnet 33 is disposed at a bottom portion of a front side of the case cover 20, the second magnet 32 and the third magnet 33 are repelled to drive the case cover 20 to bounce upwards with respect to the charging case body 10.

Specifically, the case cover 20 further includes an inner cover 21, an outer cover 22, and an upper front side plate 23. The outer cover 22 is sleeved on the inner cover 21, and the upper front side plate 23 is disposed on a front side surface of the outer cover 22. The outer cover 22 is made of a thermoplastic polyurethanes (TPU) material, and the upper front side plate 23 is made of a Polycarbonate (PC) material. The upper front side plate 23 and the outer cover 22 are bonded and fixed through a lock catch position and an adhesive tape. A second fixing groove 202 is concavely defined between a bottom portion of the upper front side plate 23 and a bottom portion of the outer cover 22, and the third magnet 33 is embedded in the second fixing groove 202 for fixing. Second embedding grooves 203 are defined on the back surface of the case cover 20, and the plurality of the first magnets 31 are embedded in the second embedding grooves 203 for fixing. A combination between the plurality of the first magnets 31 and the case cover 20 is reinforced through an adhesive tape. The plurality of the first magnets and the second embedding grooves 203 are both arc-shaped. There are two first magnets 31 on the case cover 20, and the two first magnets 31 are respectively located at corners of two sides of a top portion of the case cover 20.

A using method of the embodiment is described in detail as following.

During use, when the pressing portion 42 of the switch lock catch 40 is pressed, the hook portion 43 is separated from the hook groove 201, and at this time, since the second magnet 32 and the third magnet 33 are repelled, the case body 20 is turned upwards with respect to the charging case body 10, so as to open the accommodating cavity 101. At this time, the wireless earphones may be taken out or put in. After putting in the wireless earphones, the wireless earphones are in conduction with a circuit board (not shown in the drawings) in the charging case body 10, so that the case cover 20 may be closed, and after the case cover 20 is closed, the hook portion 43 is matched and connected with the hook groove 201, and even if the case for the wireless earphones falls, the case cover 20 is still not easy to open. At this time, a charging wire may be plugged into the charging interface 51, and the wireless earphones are charged through the circuit board; or, the case for the wireless earphones of the present disclosure is placed on the wireless charging station, the plurality of the first magnets 31 are automatically paired with the wireless charging station and are adsorbed and fixed, then, a wireless receiving coil on the circuit board is paired with a wireless charging transmitting coil on the wireless charging station, so as to realize wireless charging of the wireless earphone.

A key point of the present disclosure is as following.

The present disclosure provides the switch lock catch, the second magnet, and the third magnet, the case cover is locked through the switch lock catch, and the second magnet and the third magnet are repelled, after pressing the switch lock catch, the cover case may automatically open, so that users may operate through only one hand, which is very convenient. At the same time, when the case for the wireless earphones falls on the ground, the case cover is not easily opened, which prevent the wireless earphones from falling out and being damaged, so that the wireless earphones are well protected. In addition, the plurality of the first magnets are respectively disposed on both the back surface of the charging case body and the back surface of the case cover, and the plurality of the first magnets are magnetically attracted and fixed to the wireless charging station for wireless charging, so that the case for the wireless earphones of the present disclosure may be better adsorbed and fixed to the wireless charging station and may not easily slide off from the wireless charging station, meanwhile, the case for the wireless earphones of the present disclosure is capable of being rapidly charged in place, which brings convenience.

Technical principles of the present disclosure are described above in conjunction with specific embodiments. These descriptions are merely intended to explain the principles of the present disclosure, and cannot be construed as a limitation to scopes of protection of the present disclosure in any way. Based on explanation herein, those who skilled in the art would have been able to associate other specific embodiments of the present disclosure without involving an inventive effort, all of which fall within the scopes of protection of the present disclosure.

What is claimed is:

1. A case for wireless earphones, comprising:
   a charging case body; and
   a case cover;
   wherein the charging case body includes an accommodating cavity, and an opening of the accommodating cavity faces upwards; a rear side of the case cover is hinged to a rear side of the charging case body; the case cover is disposed with respect to the charging case body in an openable and closable manner; when the case for the wireless earphones is in a closed state, the case cover covers the opening of the accommodating cavity;
   wherein a plurality of first magnets are respectively disposed on both a back surface of the charging case body and a back surface of the case cover, the plurality of the first magnets are magnetically attracted; a second magnet is fixed to a top portion of a front side of the charging case body, a third magnet is disposed at a bottom portion of a front side of the case cover, the second magnet and the third magnet are repelled to drive the case cover to bounce upwards with respect to the charging case body; a switch lock catch capable of being elastically pressed is disposed on a front surface of the charging case body, and the switch lock catch is configured to lock the case cover.

2. The case for the wireless earphones according to claim 1, wherein the charging case body further comprises an inner case, an outer case, and a lower front side plate; the outer case is sleeved on the inner case, and the lower front side plate is disposed on a front side surface of the outer case.

3. The case for the wireless earphones according to claim 2, wherein the outer case is made of a thermoplastic polyurethanes (TPU) material, and the lower front side plate is made of a Polycarbonate (PC) material.

4. The case for the wireless earphones according to claim 2, wherein the lower front side plate and the outer case are bonded and fixed through a lock catch position and an adhesive tape.

5. The case for the wireless earphones according to claim 2, wherein a lug boss is convexly disposed on a front side surface of the lower front side plate, an accommodating groove is concavely defined on the lug boss, and the switch lock catch is located in the accommodating groove.

6. The case for the wireless earphones according to claim 5, wherein shaft holes are concavely defined in inner walls of two sides of the accommodating groove, shaft portions are respectively and convexly disposed outwards at two sides of a middle portion of the switch lock catch, and the shaft portions are respectively and rotatably clamped in the shaft holes.

7. The case for the wireless earphones according to claim 6, wherein a pressing portion is disposed at a lower end of the switch lock catch, a hook portion is disposed at an upper end of the switch lock catch, a hook groove is concavely defined on the case cover, and the hook groove is matched with the hook portion.

8. The case for the wireless earphones according to claim 7, wherein an inner bottom surface of the accommodating groove integrally extends to form an elastic sheet portion, the elastic sheet portion abuts against an inner side surface of the pressing portion to drive the pressing portion to move outwards.

9. The case for the wireless earphones according to claim 2, wherein a first fixing groove is concavely defined between a top portion of the lower front side plate and a top portion of the outer case, and the second magnet is embedded in the first fixing groove for fixing.

10. The case for the wireless earphones according to claim 1, wherein a charging interface is defined at a bottom portion of the charging case body.

11. The case for the wireless earphones according to claim 1, wherein a speaker through hole is disposed at a bottom portion of the charging case body.

12. The case for the wireless earphones according to claim 1, wherein the charging case body comprises a button, and the button is exposed to a middle portion of the back surface of the charging case body.

13. The case for the wireless earphones according to claim 1, wherein a lug portion is convexly disposed on the charging case body, and a rope hanging hole is defined on the lug portion.

14. The case for the wireless earphones according to claim 1, wherein first embedding grooves are defined on the back surface of the charging case body, second embedding grooves are defined on the back surface of the case cover, and the plurality of the first magnets are respectively embedded in the first embedding grooves and the second embedding grooves for fixing.

15. The case for the wireless earphones according to claim 14, wherein a combination between the plurality of the first magnets and the charging case body is reinforced through an adhesive tape.

16. The case for the wireless earphones according to claim 14, wherein the plurality of the first magnets, the first embedding grooves, and the second embedding grooves are all arc-shaped.

17. The case for the wireless earphones according to claim 1, wherein the case cover further comprises an inner cover, an outer cover, and an upper front side plate; the outer cover is sleeved on the inner cover, and the upper front side plate is disposed on a front side surface of the outer cover.

18. The case for the wireless earphones according to claim 17, wherein the outer cover is made of a thermoplastic polyurethanes (TPU) material, and the upper front side plate is made of a Polycarbonate (PC) material.

19. The case for the wireless earphones according to claim 17, wherein the upper front side plate and the outer cover are bonded and fixed through a lock catch position and an adhesive tape.

20. The case for the wireless earphones according to claim 17, wherein a second fixing groove is concavely defined between a bottom portion of the upper front side plate and a bottom portion of the outer cover, and the third magnet is embedded in the second fixing groove for fixing.

* * * * *